United States Patent [19]

Sawai et al.

[11] Patent Number: 4,541,165
[45] Date of Patent: Sep. 17, 1985

[54] AUTOMATIC CUTTING EDGE CHANGER FOR CUTTING TOOL

[75] Inventors: Nobushige Sawai, Ibaraki; Kaneyoshi Miyasaka, Toride; Ryoji Murata, Ibaraki, all of Japan

[73] Assignees: Agency of Industrial Science & Technology; Ministry of International Trade & Industry, both of Tokyo, Japan

[21] Appl. No.: 540,568

[22] Filed: Oct. 11, 1983

[30] Foreign Application Priority Data

Oct. 18, 1982 [JP] Japan ............................ 57-182498

[51] Int. Cl.⁴ ............................................. B23B 29/24
[52] U.S. Cl. ................................... 29/568; 82/36 A; 408/35
[58] Field of Search .................. 29/568, 26 R, 264; 82/36 R, 36 A, 36 B; 408/35, 713; 407/82; 74/826

[56] References Cited

U.S. PATENT DOCUMENTS

| 3,516,310 | 6/1970 | Lemanski | 82/36 R |
| 3,838,500 | 10/1974 | Wirfelt | 29/568 |
| 3,981,607 | 9/1976 | Jorgensen | 408/713 X |
| 4,024,777 | 5/1977 | Fogarty | 408/35 X |
| 4,326,437 | 4/1982 | Fischer | 82/36 A |
| 4,414,733 | 11/1983 | Janotik et al. | 29/568 |

FOREIGN PATENT DOCUMENTS

| 0020490 | 2/1979 | Japan | 82/36 A |
| 0102447 | 8/1981 | Japan | 29/568 |

*Primary Examiner*—William R. Briggs
*Assistant Examiner*—Glenn L. Webb
*Attorney, Agent, or Firm*—Schwartz & Weinrieb

[57] ABSTRACT

An automatic rotational cutting edge changer for use with a tool tip having a plurality of cutting edges. When a sensor detects wear or chipping in the cutting edge in use, the cutting edge changer moves this cutting edge of the tool tip out of the cutting position of the cutting tip and brings a new cutting edge of the same tool tip to the cutting position by keeping the tool tip supported in position on a rotating member and causing the rotating member to be urged in its rotating direction by a lever operated by an actuating device for the cutting edge changer.

19 Claims, 5 Drawing Figures

AUTOMATIC CUTTING EDGE CHANGER FOR CUTTING TOOL

BACKGROUND OF THE INVENTION

1. Field of the Invention

This invention relates to an apparatus for automatically changing the cutting edges of a cutting tool by a rotating action.

2. Description of the Prior Art

A cutting tool which is provided with means for replacing the blade in service with a spare blade after the blade in service has worn out or broken has been known to the art. In such known cutting tools, the tool body is provided thereon with a changer which changes blades upon the manual rotation of a lever. This setup is convenient as a simple mechanism for changing of blades. In this setup, it is necessary that the second blade which has taken the place of the first spent blade should be fixed at the stated cutting position of the cutting tool and it is further necessary that when the second blade is to be replaced with the third blade, the second blade should be released from the cutting position and the third blade moved to and fixed at the cutting position. Thus, this setup must incorporate additional means for these functions without spoiling the simplicity of the overall mechanism.

SUMMARY OF THE INVENTION

The object of this invention is to provide an apparatus for automatically changing the cutting edges of a cutting tool by a rotating action, whereby the fixing of a given cutting edge at the stated cutting position of the cutting tool and the replacement of a spent cutting edge with a fresh cutting edge can both be easily carried out.

To attain the object described above according to this invention, there is provided an apparatus for automatically changing the cutting edges of a cutting tool, which apparatus comprises means for causing a tool tip provided with a plurality of cutting edges to be fixed by the energizing force of a spring onto a tool body driven relative to a workpiece, a lever disposed on the tool body and adapted to be rotated by an actuator designed exclusively for changing cutting edges, a sliding member urged and slid inside a tubular stationary member by the aforementioned lever overcoming the energizing force of said spring, a rotating member fitted in the aforementioned tool tip and adapted to be moved by the pressure exerted by the sliding member, grooves cut in the stationary member for permitting insertion therein of projections disposed on the rotating member, and an oblique guide surface adapted to enable the projections to slide circumferentially on the stationary member when the projections are removed from the grooves by the pressure exerted by the sliding member.

Since the apparatus for automatic rotational change of cutting blades is substantially composed of the three principal elements, that is, the sliding member, the stationary member, and the rotating member as described above, it is extremely simple in construction and is capable of quickly and safely changing a spent cutting edge with a fresh cutting edge with ease without requiring its own special source of motive power.

BRIEF DESCRIPTION OF THE DRAWINGS

The other objects and characteristic features of this invention will become apparent to those skilled in the art as the further disclosure is made in the following description of invention with reference to the accompanying drawings, wherein.

DESCRIPTION OF THE PREFERRED EMBODIMENT

FIGS. 1-4 depict an apparatus for automatically changing the cutting edges of a cutting tool by a rotating action, as one embodiment of this invention in a rotary cutting machine such as, for example, a milling machine. On the periphery of a tool body 1 which is rotated by a power source for cutting such as a motor (not shown) a required number of cutting edge changers 2 are disposed. Each of the cutting edge changers 2 retains therein a tool tip 4 provided on the periphery thereof with a plurality of cutting edges 4', 4" . . . .

Figure 1:
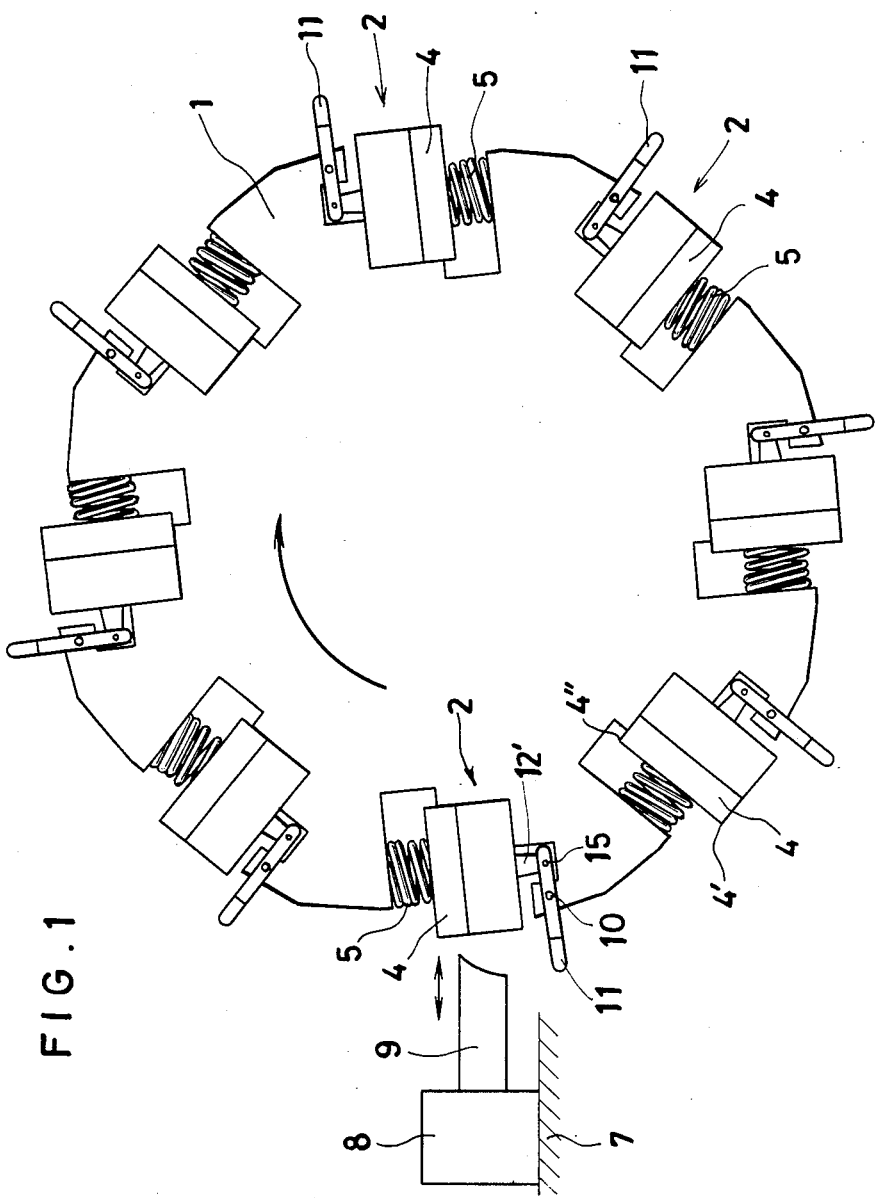
FIG. 1 is a plan view illustrating a cutting tool provided with an apparatus of the present invention for automatically changing the cutting edges of a cutting tool.
Figure 2:
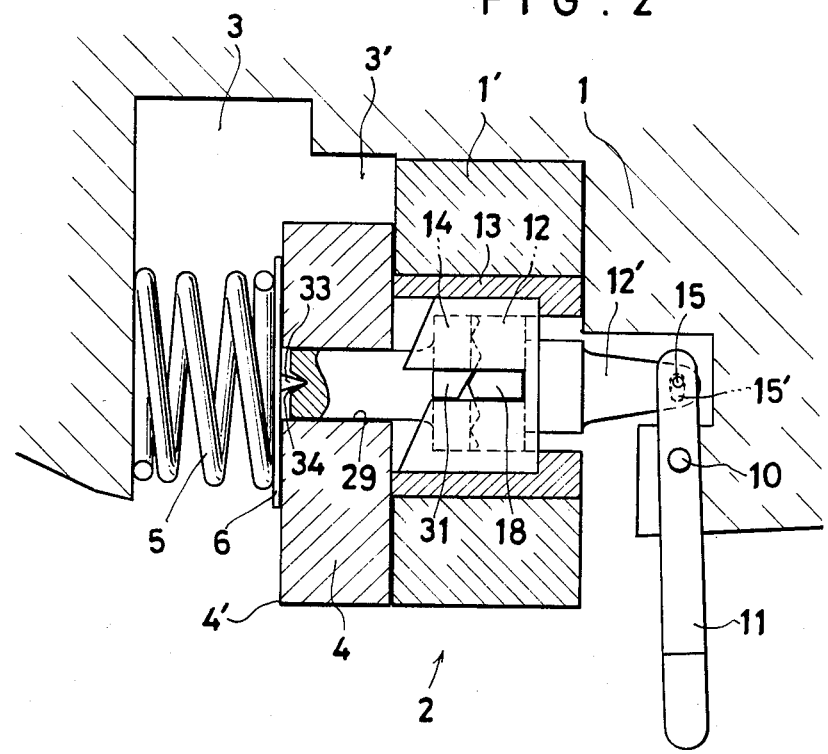
FIG. 2 is an enlarged cross section illustrating a cutting edge changer according to the present invention.

As illustrated in FIG. 2, each cutting edge changer 2 has its tool tip 4 disposed on a tool tip seat 3' formed inside a recess 3 in the periphery of the tool body 1 for permitting disposition of the tool tip so that one of the cutting edges 4', 4" . . . may protrude in a required direction from the tool body 1. This tool tip 4 is retained fast on the aforementioned tool tip seat 3' by means of a tip retainer spring 5 exerting pressure upon the tool tip 4 through a washer 6. This tip retainer spring 5 is capable of generating enough force to keep the tool tip 4 in position against the cutting resistance imparted to the tool tip 4. As illustrated in FIG. 1 which depicts one embodiment of the cutting edge changer 2 for rotationally moving a plurality of cutting edges 4', 4" . . . on the tool tip 4 to the stated cutting position of the tool tip 4 by the rotation of the tool tip 4, the cutting edge changer 2 is set moving by an actuating device 8 such as an air cylinder or solenoid which is provided on a stationary part 7 of the cutting machine. The aforementioned actuating device 8 is provided with a dog 9 adapted to be selectively switched by the actuating device to the cutting edge changer actuating position (protruded position) or retracted to the non-actuating position. This dog 9 is adapted so that when it is protruded in the direction of the tool body 1 and set in the actuating position thereof, it will come into engagement with a lever 11 in the cutting edge changer 2 on the tool body 1 and rotate this lever 11 for the purpose of rotationally changing cutting edges. The aforementioned lever 11 is rotatably supported on a pivot 10 disposed on the periphery of the tool body 1 and is provided at the leading end thereof with a pin 15 which is fitted in a slotted hole 15' formed at the basal end 12' of a sliding member 12. As the force generated in consequence of the engagement of the dog 9 with the outer end of the lever 11 is converted into a large force owing to the principle of leverage, the sliding member 12 is urged into a tubular stationary member 13 against the energizing force of the aforementioned tip retainer spring 5.

Figure 3:
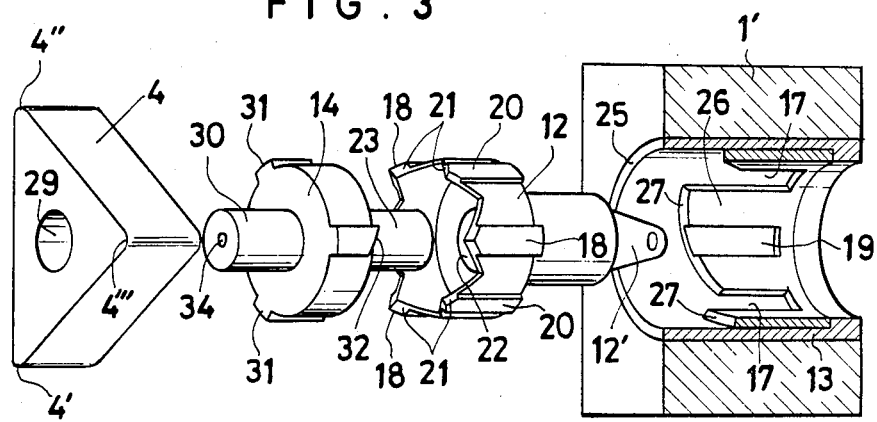
FIG. 3 is a perspective view illustrating the cutting edge changer of FIG. 2 in a disassembled state.
Figure 4:
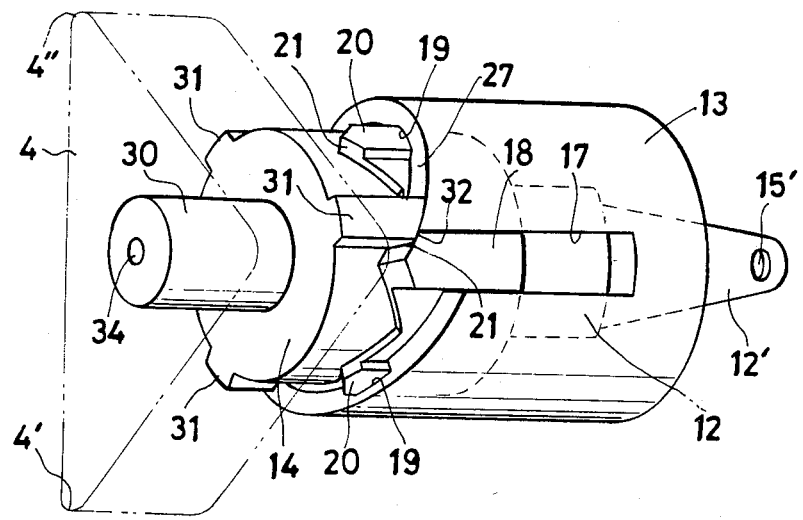
FIG. 4 is a perspective view illustrating the essential part of the cutting edge changer in an operating state.

The sliding member 12 is slidably disposed within the tubular stationary member 13 which is disposed in a tool shank 1' as illustrated in FIGS. 2-4. On the peripheral surface of the sliding member 12, a plurality of protuberances 18 adapted to be inserted into grooves 17 formed in the stationary member 13 and a plurality of protuberances 20 adapted to be fitted into grooves 19 formed in the stationary member 13 are alternately disposed. The sliding member 12 is further provided on the leading end surface thereof at the positions corresponding to those of the aforementioned protuberances 18, 20 with mountain-like sloped surfaces 21. At the center of the leading end surface, there is formed a hole 22 for permitting insertion therein of a shaft 23 of a rotating member 14. In the illustrated embodiment, the number of protuberances 18 is three. This number should be identical with the number of cutting edges formed on the tool tip 4. The protuberances 20 and the grooves 19 to be fitted on the protuberances are intended for enabling the sliding member 12 to be safely slid and retained on the stationary member 13. Their number, therefore, may be suitably selected to fulfill this purpose most advantageously.

The tubular stationary member 13 which permits insertion therein of the aforementioned sliding member 12 is stationarily disposed on the tool shank 1'. On the inner wall of a substantially cylindrical tubular member 25, the aforementioned grooves 17 and the grooves 19 are alternately formed. The leading end surfaces of lands 26 intervening between the grooves 17 form slanted guide surfaces 27 sloped in one circumferential direction of the tubular member 25 inwardly relative to the axial direction of the tubular member 25. Thus, the number of these guiding surfaces should be identical with the number of the cutting edges.

The rotating member 14 whose shaft 23 is fitted into the hole 22 of the sliding member 12 is provided with a tip supporting shaft 30 adapted to be fitted into a central hole 29 of the tool tip 4 and also provided with projections 31 adapted to be fitted into the grooves 17 of the stationary member 13 so as to keep the tool tip 4 fast in position.

The projections 31 of the rotating member 14 are provided with sliding surfaces 32 adapted to slide on the mountainlike sloped surfaces 21 of the sliding member 12 and on the slanted guide surfaces 27 of the stationary member 13. In the leading end surface of the tip supporting shaft 30, a conical hole 34 adapted to permit insertion therein of a pointed shaft 33 provided at the center of the aforementioned spring washer 6 is sunken.

When the central hole 29 of the tool tip 4 is fitted on the tip supporting shaft 30 of the rotating member 14, they are required to rotate simultaneously. This requirement is fulfilled such as, for example, by forming the tip supporting shaft 30 and the central hole 29 in an identical polygonal cross section or by disposing leaf springs on the peripheral surface of the tip supporting shaft 30 and providing the central hole 29 on the inner wall thereof with recesses for receiving the aforementioned leaf springs respectively.

Now, the operation of the automatic rotational cutter edge changer constructed as described above will be described below.

When the occurrence of excessive wear or chipping in the cutting edge of any of the tool tips is detected as by a detection device disclosed in Japanese Patent Application Disclosure No. Sho 57(1982)-163042 while the tool body 1 is being rotated by a cutting power source, the signal issued by the detection device sets the actuating device 8 operating and causes the dog 9 to thrust out immediately before the particular tool tip 4 requiring change of cutting edges passes in front of the dog 9. Consequently, the lever 11 of the cutting edge changer 2 is brought into engagement with the dog 9 and is made to pivot counterclockwise around the pivot pin 10 as illustrated in FIG. 2.

By the aforementioned pivotal movement of the lever 11, the sliding member 12 is urged in the direction of pressing the tool tip 4 through the medium of the rotating member 14 against the force of the spring 5. While the sliding member 12 is in the course of this motion, the protuberances 18, 20 formed on the peripheral surface of the sliding member 12 are slid inside the grooves 17 and the grooves 19 respectively. In consequence of this motion of the sliding member 12, the projections 31 of the rotating member 14 which have been fitted into the grooves 17 of the stationary member 13 are pressed by the protuberances 18 of the sliding member 12 and consequently moved along the grooves 17 toward the left relative to the position indicated in FIG. 2. As the protuberances 18 are further moved and halves of the mountainlike sloped surfaces falling on one side come to form continued oblique surfaces with the slanted guide surfaces 27 of the lands 26 of the stationary member 13, the sliding surfaces 32 of the projections 31 begin to slide on the slanted guide surfaces 27 (FIG. 4). As the lever 11 returns to its original position and, consequently, the rotating member 14 and the sliding member 12 are returned to their original positions by the spring 5, the projections 31 are automatically fitted into the subsequent grooves 17 at the terminal sides of the slanted guide surfaces 27. The tool tip 4 has consequently been rotated by 120° in the illustrated embodiment in conjunction with the rotating member 14 and, automatically, the unused cutting edge 4" of the tool tip 4 has been moved to the stated cutting position of the particular tool tip 4. When the aforementioned tool tip 4 is rotated, the rotating member 14 urges the tool tip 4 and separates it from the tool tip seat 3' of the recess 3 for the disposition of the tool tip and, at the same time, causes the pointed shaft 33 of the washer 6 to be inserted into the conical hole 34 formed in the tip supporting shaft 30 of the rotating member 14, and compresses the spring 5 by point contact. Consequently, the tool tip 4 is allowed to rotate smoothly in conjunction with the rotating member 14 by an angle of 120° without experiencing any appreciable resistance.

Desirably, this change of cutting edges is carried out in the zone in which the work is not cut by the cutting edge.

When the aforementioned automatic cutting edge changer is adopted, since its construction is simple and its size is small, a multiplicity of tool tips may be laid around the tool body similarly to any ordinary cutting tool.

Figure 5:
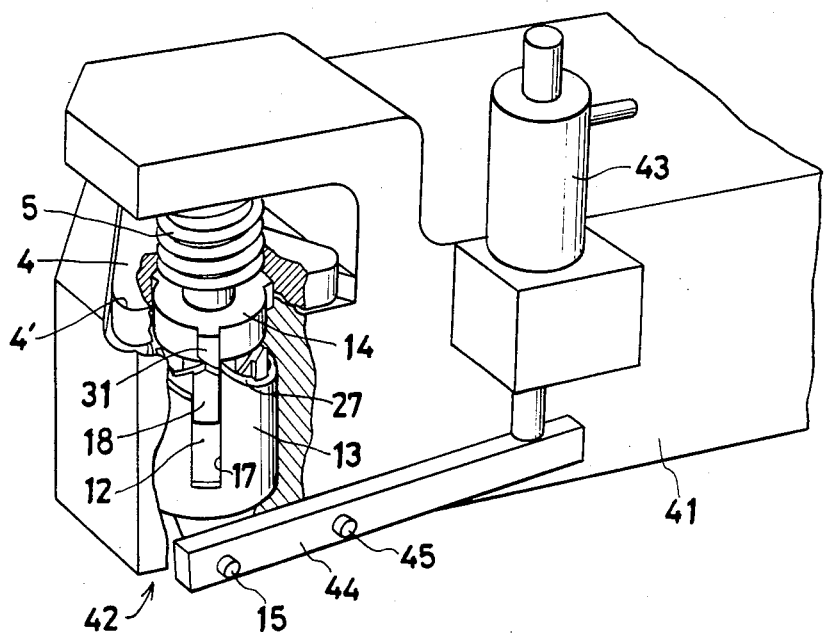
FIG. 5 is a perspective view illustrating another typical cutting edge changer of this invention.

FIG. 5 represents an embodiment of this invention in which the cutting edge changer is applied to a tool of the type used as in a lathe. A cutting edge changer 42 similar to the changer used in the preceding embodiment is disposed on a tool shank 41. In this cutting edge changer 42, a cutting edge changer actuating device 43 such as an air cylinder or solenoid rotates a lever 44 with a pin 45 as the pivot, whereas the cutting edge changer actuating device in the preceding embodiment imparts rotation to the lever 11 in the cutting edge changer 2 on the tool body 1 to be rotated by causing the dog 9 to thrust into the path of the rotation of the lever 11. When the sensor detects wear or chipping in the cutting edge 4', the cutting edge changer actuating device 43 is set moving to rotate the lever 44 and raise the sliding member 12. From this point onward, the procedure of the preceding embodiment is repeated to rotate the rotating member 14 and the tool tip 4 by a prescribed angle and move the next cutting edge to the stated cutting position of the cutting tool.

As is plain from the detailed description above, the device of the present invention for cutting edge change in the cutting tool combines two functions in one, that is, the function of fixing the tool tip after each change of cutting edges and the function of releasing the fixed tool tip preparatory to the next cutting edge change. Moreover, this device is simple in construction. Without requiring its own special source of power, the automatic cutting edge changer can be easily applied to a cutting tool already in use and enables the cutting work to be accurately and effectively carried out.

Obviously, many modifications and variations of the present invention are possible in light of the above teachings. It is therefore to be understood that within the scope of the appended claims, the present invention may be practiced otherwise than as specifically described herein.

What is claimed is:

1. A mechanism for changing the cutting edges of a workpiece cutting-tool tool-tip, comprising:
    a stationary member having a plurality of grooves defined therein, and a plurality of guide surfaces inclined transversely with respect to said grooves;
    a rotatable member, upon which said cutting-tool tool-tip is fixedly disposed, having a set of projections for disposition within said grooves of said stationary member so as to lock said tool-tip within a predetermined angular position relative to said cutting tool;
    means biasing said rotatable member toward said stationary member so as to retain said projections of said rotatable member within said grooves and said tool-tip in said locked position;
    a slideable member in contact with said rotatable member and slideably disposed within said stationary member under the influence of said biasing means between a first position at which said projections of said rotatable member are disposed within said grooves of said stationary member, and a second position at which said projections of said rotatable member are disposed freely outside of said grooves of said stationary member, said slideable member having means thereon for causing initial rotation of said rotatable member when said slideable member is disposed at said second position such that said rotatable member projections engage said transversely inclined surfaces of said stationary member under the influence of said biasing means so as to cause additional rotation of said rotatable member and said tool-tip to a new predetermined angular position relative to said cutting tool; and
    means for moving said slideable member from said first position to said second position against the biasing force of said biasing means.

2. A cutting edge changer according to claim 1 wherein the number of said plurality of slanted guide surfaces provided on said stationary member is identical with the number of said plurality of cutting edges formed on said tool tip.

3. A cutting edge changer according to claim 1, wherein said stationary member is retained on the tool shank of said cutting tool.

4. A cutting edge changer according to claim 1, wherein said sliding member is provided on the outer circumference thereof with protuberances adapted to fit into said plurality of grooves in said stationary member and brought into contact at the upper surfaces thereof with the lower surfaces of said plurality of projections.

5. A cutting edge changer according to claim 2, wherein said sliding member is provided on the outer circumference thereof with protuberances adapted to fit into said plurality of grooves in said stationary member and brought into contact at the upper surfaces thereof with the lower surfaces of said plurality of projections.

6. A cutting edge changer according to claim 3, wherein said sliding member is provided on the outer circumference thereof with protuberances adapted to fit into said plurality of grooves in said stationary member and brought into contact at the upper surfaces thereof with the lower surfaces of said plurality of projections.

7. A cutting edge changer according to claim 4, wherein the upper surfaces of said protuberances and the lower surfaces of said plurality of projections have the same inclination as that of said plurality of slanted guide surfaces.

8. A cutting edge changer according to claim 5, wherein the upper surfaces of said protuberances and the lower surfaces of said plurality of projections have the same inclination as that of said plurality of slanted guide surfaces.

9. A cutting edge changer according to claim 6, wherein the upper surfaces of said protuberances and the lower surfaces of said plurality of projections have the same inclination as that of said plurality of slanted guide surfaces.

10. A cutting edge changing mechanism as set forth in claim 1, wherein:
    said guide surfaces of said stationary member are disposed circumferentially about said stationary member.

11. A cutting edge changing mechanism as set forth in claim 1, wherein:
    said stationary member is a hollow tubular member.

12. A cutting edge changing mechanism as set forth in claim 1, wherein:
    said grooves are oriented parallel to the longitudinal axis of said stationary member.

13. A cutting edge changing mechanism as set forth in claim 1, further comprising:
    means mounting said mechanism within a milling machine.

14. A cutting edge changing mechanism as set forth in claim 1, further comprising:
    means mounting said mechanism within a lathe.

15. A cutting edge changing mechanism as set forth in claim 1, wherein:
    said means for moving said slideable member comprises a lever.

16. A cutting edge changing mechanism as set forth in claim 15, further comprising:
    solenoid means mounted upon said cutting tool for moving said lever.

17. A cutting edge changing mechanism as set forth in claim 15, further comprising:

air cylinder means mounted upon said cutting tool for moving said lever.

18. A cutting edge changing mechanism as set forth in claim 1, wherein:

the number of said guide surfaces of said stationary member is the same as the number of cutting edges of said tool-tip.

19. A cutting edge changing mechanism as set forth in claim 1, wherein:

said tool-tip is interposed between said biasing means and said rotatable member; and said slideable member is interposed between said rotatable member and said stationary member.

* * * * *